March 29, 1955   C. H. JONES   2,704,856
PORTABLE MACHINES FOR STRIPPING INSULATION FROM WIRES
Filed Dec. 15, 1950   2 Sheets-Sheet 1
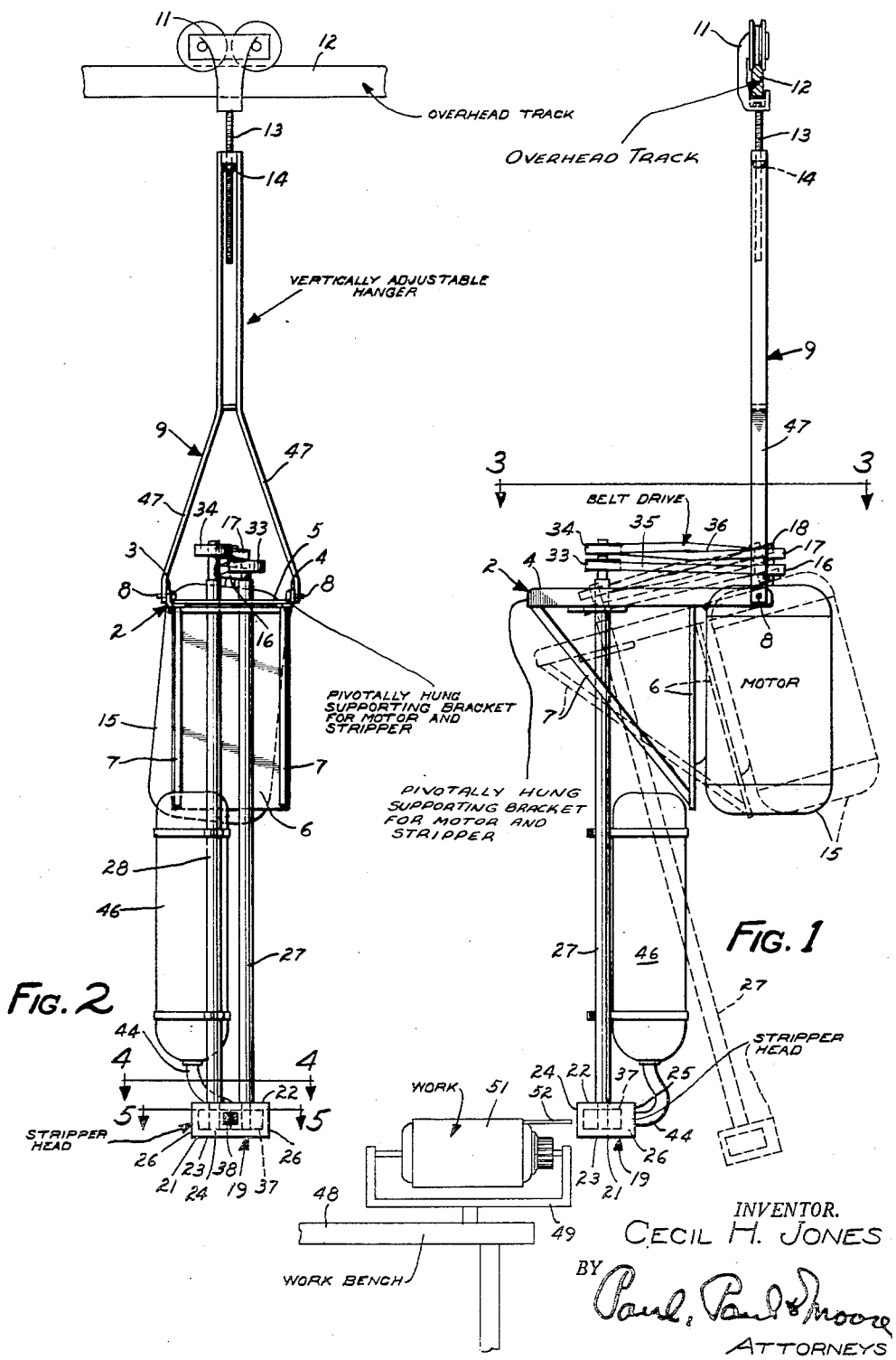

March 29, 1955     C. H. JONES     2,704,856
PORTABLE MACHINES FOR STRIPPING INSULATION FROM WIRES
Filed Dec. 15, 1950     2 Sheets-Sheet 2

INVENTOR.
CECIL H. JONES
BY
Paul, Paul & Moore
ATTORNEYS

United States Patent Office 2,704,856
Patented Mar. 29, 1955

2,704,856

PORTABLE MACHINES FOR STRIPPING INSULATION FROM WIRES

Cecil H. Jones, Mankato, Minn., assignor to Kato Engineering Company, Mankato, Minn., a corporation of Minnesota Application December 15, 1950, Serial No. 200,890

6 Claims. (Cl. 15—312)

This invention relates to new and useful improvements in machines for stripping insulation from the ends of insulated wires, and more particularly to a portable device which may readily and conveniently be placed in working position adjacent to the work to facilitate and expedite the operation of stripping the insulating material from the end of the wire preparatory to electrically connecting the wires in electric circuits in the course of manufacturing electrical apparatus, or making repairs thereto.

It is well known that before the end of an insulated wire can be electrically connected in an electric circuit the insulating material must be stripped from the end of the wire to assure a good electric connection, and the present invention pertains to the provision of a machine for accomplishing this operation in an efficient and expeditious manner without damaging the wire, and with the assurance all of the insulation, regardless of type, is thoroughly and completely removed from the wire. Numerous attempts have heretofore been made to provide machines for facilitating the removal of insulating materials from the insulated wires, but to the best of my knowledge, none of these have been entirely satisfactory. There is therefore a need for a machine of this type which shall be capable of quickly and completely stripping insulation from insulated wires in a highly expeditious and efficient manner, whereby the cost of thus stripping the ends of wires, when connecting the coils of armatures, stators, or of other electric equipment, or when making repairs thereto, may be reduced to a minimum.

The novel wire stripper herein disclosed is the result of considerable experimental and research work in an attempt to devise a portable machine of this type in which all of the objections present in machines of this type now in use have been entirely eliminated.

An important object of the present invention is to provide a portable machine for stripping insulation from wires adapted to be suspended from a supporting trolley means positioned on an overhead track, whereby the machine may be readily moved about from place to place over a work bench, or over an assembly floor where a mechanic may be assembling coils in an armature ring or a rotor, and whereby a stripper head or housing containing a pair of rotary brushes is supported at one end of a pair of elongated substantially parallel adjacent tubular members, said housing having an aperture therein and one of said tubular members being movable within said aperture so that the extending tubular members may be quickly grasped by the mechanic and the machine may be applied to the work by moving the housing to the ends of each coil, said housing having an opening communicating with the interior thereof in a zone between said brushes, in which ends of each coil may be inserted, and the tubular members then squeezed to completely strip the insulation from the wire end so that good electric connections may be assured without failure.

A further object is to provide a wire stripper comprising a frame having a motor thereon, and said frame and motor being suspended from an overhead track by suitable means to facilitate moving the stripper head into position to engage the work, and said motor having a driving connection with the upper ends of a pair of spaced shafts positioned within a pair of spaced elongated tubular members, the extending end of one of said tubular members being movable with respect to the extending end of the other of said tubular members, the extending ends of said spaced shafts being equipped with small wire brushes so disposed within a stripper head or housing that when the end of an insulated wire is inserted into said head between said brushes and said elongated members are moved together, said brushes will quickly strip all of the insulating material from the wire and thoroughly clean the surface thereof so that the ends of adjacent coils may readily be soldered together in a manner to provide good electric connections.

A further object is to provide an apparatus of the class described, comprising a pair of spaced shafts each provided at its lower end with a wire brush and a housing enclosing said brushes and having an opening therein for the insertion of the end of a wire to be stripped of its insulation, and a suction device being connected to said housing for withdrawing the strippings therefrom.

A further object is to provide a wire stripper of the class described comprising a bracket having a motor mounted thereon, and a pair of tubular members being secured to and depending from said bracket and providing supports for a pair of shafts having their upper ends drivingly connected to the motor for direct rotation therewith, and a small stripper head or housing being secured to the lower end of one of said tubular members and enclosing coacting brushes secured to said shafts, the other tubular member having its lower end unsecured to the stripper head housing whereby it may be moved relative to the fixed tubular member in directions towards or away therefrom to vary the stripping action of the brushes on the wire, said tubular members also serving as a hand grip to be grasped by the operator in the operation of guiding the stripper head to the work, particularly when the work is of such a nature that it cannot readily be moved about from place to place.

Other objects of the invention reside in the arrangement of the tubular shaft supporting members, whereby one of said members is secured to the stripper head or housing and the other is unsecured thereto, whereby one tubular member is movable in a direction towards or away from the other tubular member so that when an operator grasps the two tubular members adjacent to the stripper head, he may accurately control the stripping action of the brushes upon the wire to be stripped by simply varying the firmness of his grip on the tubular members; and in the provision of a suction device which may be carried directly upon the apparatus, as for example, on the fixed tubular member, which has a suction tube connected to the stripper head whereby the strippings of insulation removed from the wires may be withdrawn from the housing, so as to keep it empty of such strippings which might eventually interfere with the operation of the stripper brushes, should they accidentally be left in the stripper head; in the provision of such an apparatus which is extremely simple and inexpensive, and is light in weight so that it may readily be moved about from one place to another on an overhead rail with the stripper head positioned at an elevation where it may readily be moved into stripping engagement with the ends of coils which are to be stripped of insulation; and in the provision of such an apparatus which presents the utmost in portability in all directions, whereby it may readily and quickly be brought into engagement with the end of a wire to be stripped of its insulation, whether such wire or wires constitutes the ends of coils or windings being assembled in an armature frame, stator, or other electric apparatus, the overhead support permitting the stripper head to be readily moved to any place in a shop where adequate overhead trackage is provided.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a side elevation of the novel wire stripper herein disclosed showing it suspended from an overhead rail with its stripper head conveniently located adjacent to an armature supported on a work bench;

Figure 2 is a front view of the apparatus illustrating the arrangement of the two tubular members and the opening provided in the stripper head into which the ends of wires to be stripped of insulation are inserted;

Figure 3:
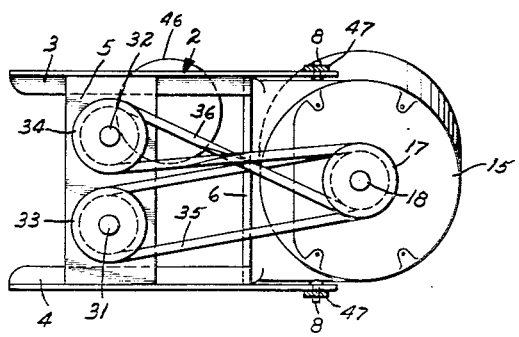
Figure 3 is a sectional plan view substantially on the line 3—3 of Figure 1, showing the flexible driving elements between the motor and brush-supporting shafts.

The novel wire stripper herein disclosed is shown comprising a frame, generally designated by the numeral 2, having upper horizontally disposed side rails 3 and 4, preferably of angle iron cross-section. A plate 5 is suitably secured to the horizontal flanges of the side rails by such means as welding, as will be understood by reference to Figures 2 and 3. The frame also comprises a vertically disposed plate 6 having diagonal braces 7 secured to its lower edge portion, and the upper ends of said braces being secured to the side rails 3 and 4 of the upper horizontal portion of the frame, as clearly illustrated in Figures 1 and 2. The side rails are apertured at their ends opposite from the end to which the diagonal braces are secured, thereby to receive pivot pins 8 which pivotally connect the frame to the lower end of a suitable hanger 9.

The hanger is provided at its upper end with a trolley 11 adapted to travel on an overhead track or rail 12, best illustrated in Figures 1 and 2. The hanger 9 is adjustably secured to the trolley 11 by a threaded rod 13 having its upper end secured to the trolley and its intermediate portion received in a bore provided in the upper end of the hanger 9. A nut 14 is received in threaded engagement with the rod 13, whereby the frame 2 may be vertically adjusted upon the rod 13 to properly position the stripper head relative to the work. A suitable motor 15 is secured to the vertically disposed plate 6 of the supporting bracket and has drive pulleys 16 and 17 secured to its shaft 18.

An important feature of the present invention resides in the means provided for supporting the stripper head, generally designated by the numeral 19. The stripper head comprises a housing 21 having a top wall 22, bottom wall 23, front and back walls 24 and 25, respectively, and end walls 26. An elongated tubular member 27 has its lower end fixed to the top wall 22 of the stripper head housing and its upper end extends through an aperture in the horizontal plate 5 of the frame 2 and is fixedly secured therein.

Figure 4:
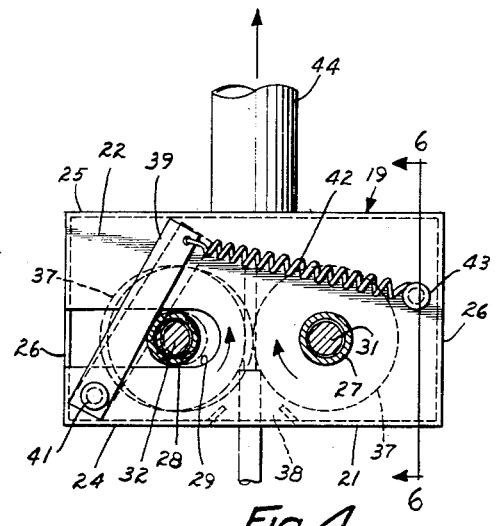
Figure 4 is a sectional plan view on the line 4—4 of Figure 2, showing the means for constantly urging the movable brush supporting shaft towards the fixed shaft.

A similar elongated tubular member 28 has its upper end similarly secured in the plate 5 of the frame 2 and extends downwardly with its lower end extending through an elongated slot or opening 29 in the top wall 22 of the stripper head housing, as best illustrated in Figure 4. It will be seen by reference to Figures 1 and 2 that the elongated tubular members 27 and 28 are so positioned and of such extension that they may be simultaneously grasped by the hand of an operator adjacent the stripper head 19 whereby the tubular members may be flexed and forced towards one another.

Shafts 31 and 32, are rotatively supported in the tubular members 27 and 28, respectively, and are provided at their upper ends with grooved pulleys 33 and 34 which are operatively connected to the drive pulleys 16 and 17 of the motor by V-belts 35 and 36. Belt 36 is given a half twist to cause shafts 32 to rotate in a direction opposite to shaft 31, as clearly illustrated in Figure 3. Suitable brushes 37 are secured to the lower ends of shafts 31 and 32 and rotate in opposite directions, as indicated by the arrows in Figure 5.

Figure 5:
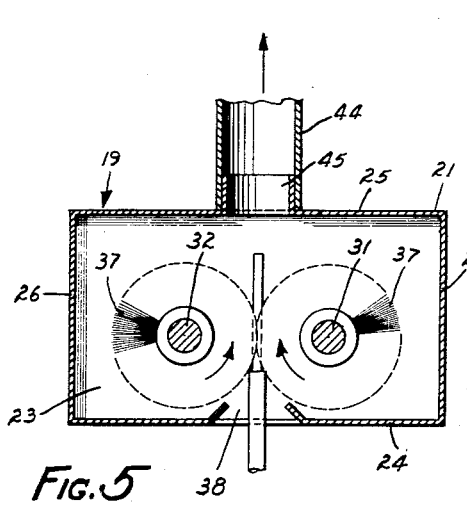
Figure 5 is a detail sectional view substantially on the line 5—5 of Figure 2.

An opening 38 is provided in the front wall 24 of the stripper head housing to receive the wires to be stripped of insulation, and whereby a wire end inserted into the opening 38 will be properly received between the brushes 37, as illustrated in Figure 5, whereby the brushes will quickly and completely strip all insulation from the wire end and leave the copper wire bare and clean of foreign matter so that it may readily be soldered to another wire or element with the assurance a good electrical connection is provided between wires.

Another important feature of the invention resides in the means provided for varying the pressure of the stripper brushes 37 on the wire. To readily and conveniently thus vary the pressure of the stripper brushes on the wire, tubular member 28 has its lower end movably supported in the slot 29. A spring-biased lever 39 constantly urges tubular member 28 in a direction towards its complemental tubular member 27. Lever 39 is pivoted to the top wall of stripper housing 19, as indicated at 41 in Figure 4. One end of a spring 42 is attached to the free end of said lever and the opposite end of said spring is shown anchored to the housing 19 by a screw or stud 43. The lever 39 bears against the tubular member 28 and thus constantly urges said member towards the tubular member 27, as will be understood by reference to Figure 4.

Figure 6:
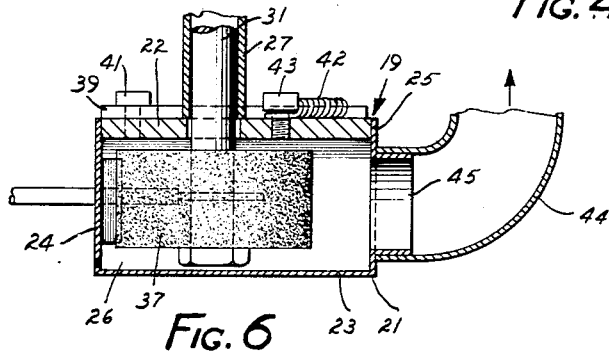
Figure 6 is a detail sectional view on the line 6—6 of Figure 4.

Means is provided for collecting the strippings of insulating material stripped from the ends of the wires. Such means is shown comprising a suction hose 44 having one end attached to a collar 45 provided on the back wall 25 of the stripper head, as best illustrated in Figures 5 and 6. The opposite end of the suction hose is connected to a suitable suction device 46, which may be of well known construction. The suction device 46 may be secured to one of the tubular shaft supporting members, as for example member 28.

In use, the novel apparatus herein disclosed, is suspended from an overhead track 12, as illustrated in Figures 1 and 2. The bracket 2 being pivotally connected to the lower spaced arms 47 of the hanger 9, may freely pivot thereon, as indicated in the full and dotted lines in Figure 1. The bracket and all parts supported thereby may also be freely rotated about the axis of the threaded rod 13, whereby the stripper head 19 may readily and conveniently be accurately positioned with respect to the work, as will be understood by reference to Figure 1.

To afford a clearer explanation of the invention, there is illustrated in Figure 1 a work bench 48 having an armature supporting member 49 mounted thereon. An armature 51 is shown supported in the member 49 to facilitate making repairs thereto. In Figure 1, the armature is shown having a wire end 52 projecting outwardly therefrom in position to have its insulation stripped therefrom. The stripper head 19 being freely movable relative to the work bench 48, enables the mechanic to readily move the stripper ahead into engagement with the wire end 62, whereby the rapidly rotating brushes 37 in the stripper head will instantly strip the insulation from the wire and leave the end thereof bare and free of insulation so that it may readily be united to another wire by soldering, with the assurance that a good electric connection is obtained. When making repairs on larger equipment such as alternators, generators, and the like, which cannot readily be placed on a work bench or table, the stripper is moved to the work where it may be suspended adjacent to the stator frame or rotor in which coils are being assembled or repaired, and whereby the stripper head is always readily available to strip the ends of the wires.

The novel suspension of the stripper head provides a universal support therefor, whereby it may be freely rotated, as desired, and may be conveniently swung into or out of engagement with the work without effort. It is usually so adjusted on the trolley that the wire receiving opening 38 in the stripper head is positioned substantially at the same elevation as the wire ends to be stripped are disposed, as illustrated in Figure 1. To minimize wear on the belt 36, motor 15 is preferably mounted at an angle on its supporting plate 6, as indicated in Figure 2.

In the operation of the device the operator grasps the two tubular members 27 and 28 adjacent to the stripper head 19. The stripper head is then swung into engagement with the wire to be stripped, as shown in Figures 4 and 5, whereby the rotary brushes 37 engage and strip the insulation from the wire. Some insulating materials may be extremely difficult to remove from the copper wire. With the novel stripper herein disclosed, such insulation may readily and quickly be removed or stripped from the wire without loss of time because the operator has complete control of the apparatus at all times. Should a certain insulation resist removal, the operator simply grasps the two tubular members with a firmer grip, whereby the tubular members are flexed and the brushes are forced towards one another, thereby to increase the stripping action of the rotary brushes on the wire. The insulating material may thus be quickly removed from the wire regardless of the character thereof.

The frame 2 and motor 15 are so mounted on the hanger 9 that the tubular members 27 and 28 are normally suspended in an upright position, as shown in full lines in Figure 1, it being understood that the frame 2 and motor are balanced on the pivots 8, whereby the stripper head is always freely movable in any direction. The angular position of the motor 15 on its supporting bracket, as shown in Figure 2, greatly minimizes wear on the twisted belt 36 and also reduces friction.

The portability of the apparatus makes it possible to readily and conveniently move it about from place to place where the work operations are to be performed. In some repair shops and factories, overhead tracks 12 may be provided over all work benches, and over assembly floors, whereby wire strippers may be conveniently brought to the work without loss of time, and without requiring shifting of the work from one place to another, as is now quite common, where conventional equipment is utilized for accomplishing such stripping of the wire ends.

The invention has been found extremely practical in electrical repair shops as it greatly reduces the cost of stripping insulation from the ends of armature and stator coils to be joined together by soldering, because by its use, the time required to strip a wire is reduced to a minimum.

The novel stripper herein disclosed readily removes all types of insulation from wires, including enamel and other modern insulating materials, which heretofore have been extremely difficult to remove. The suction device attached to the stripper housing collects all strippings, whereby the work bench and floor may be kept free and clear of such debris. When not in use, the device may readily be maneuvered into an out of the way place by reason of the overhead tracks 12.

In Figure 1 the wire stripping machine is shown suspended over the work bench in such a manner that the stripper head 19 is normally positioned at the front of the work bench. If desired, the machine may be so suspended that the stripper head is normally positioned towards the rear of the bench 48, whereby it will not be in the way of the mechanic when he is working on a job which may not require the use of the stripper. The universal mounting of the stripper is such that it may readily be positioned at any particular location relative to the work bench, depending upon the location of its supporting track 12 relative to the work bench.

The foregoing detailed description has been given for clearness of understanding only and no unnecessary limitations should be understood therefrom, but the appended claims should be construed as broadly as permissible in view of the prior art.

I claim as my invention:

1. A machine for stripping insulation from wires comprising in combination an overhead track, a trolley positioned thereon, means pivotally suspending a motor from said trolley with its shaft extending in a substantially vertical direction including a frame, a pair of elongated substantially parallel adjacent tubular members depending from said frame and attached at their upper ends to said frame, a shaft in each tubular member having a rotary brush secured to the lower end thereof, the upper end of each shaft projecting from the upper end of its respective tubular member and each having a belt drive operatively connecting it to said motor, said belt drives from said shafts being connected to the motor for rotation of said shafts in opposite directions, one of said tubular members being secured to a housing enclosing said rotary brushes, said housing having an elongated aperture therein, the other of said tubular members being positioned in said elongated aperture for movement therein, spring means urging said tubular members together, a suction collection device carried by one of said tubular members and having a communication with said housing, said housing having an opening communicating with the interior thereof in the zone between said brushes and said tubular members being so positioned as to be capable of being simultaneously grasped in the hand of an operator.

2. A machine for stripping insulation from wires in accordance with claim 1, wherein one of said belts has a half twist therein to cause the brushes in the stripper head to rotate in opposite directions, and said motor is angularly disposed with respect to said shafts, thereby to minimize wear in said twisted belt.

3. A machine for stripping insulation from wires according to claim 1 wherein one of said belts has a half twist therein to cause the brushes in the stripper head to rotate in opposite directions, and said frame, motor, and said shafts are suspended in a balanced condition so that the shafts are normally maintained in vertical positions.

4. A machine for stripping insulation from wires comprising in combination an overhead track, a supporting trolley positioned thereon, means pivotally suspending a motor from said trolley including a frame, a pair of elongated substantially parallel adjacent tubular members depending from said frame and fixed at their upper ends to said frame, a shaft in each tubular member having a rotary brush secured to the lower end thereof, the upper end of each shaft connected to said motor for rotation of said shafts in opposite directions, one of said tubular members being secured to a housing enclosing said rotary brushes, said housing having an aperture therein having a dimension substantially larger than the diameter of said tubular member, the other of said tubular members being positioned in said aperture for movement therein, means for biasing said movable tubular member towards said fixed tubular member with a minimum bias, said housing having an opening communicating with the interior thereof in the zone between said brushes, and said tubular members being so positioned as to be capable of being simultaneously grasped by the hand of an operator.

5. A machine for stripping insulation from wire according to claim 4, wherein a device is connected to said housing for collecting the removed insulation.

6. A machine for stripping insulation from wires comprising in combination an overhead track, a trolley positioned thereon, a frame pivotally suspended from a hanger, said hanger having its upper end connected to said trolley, a motor positioned on said frame with its shaft extending in a substantially vertical direction, a pair of elongated substantially parallel adjacent tubular members depending from said frame and attached at their upper ends to said frame, a shaft in each tubular member having a rotary brush secured to the lower end thereof, the upper end of each shaft projecting from the upper end of its respective tubular member and each having a belt drive operatively connecting it to said motor, said belt drives from said shafts connected to the motor for rotation of said shafts in opposite directions, one of said tubular members being secured to a housing enclosing said rotary brushes, said housing having an elongated aperture therein, the other of said tubular members being positioned in said elongated aperture for movement therein, spring means urging said tubular members together, a suction collection device carried by one of said tubular members and having a communication with said housing, said housing having an opening communicating with the interior thereof in the zone between said brushes and said tubular members being so positioned as to be capable of being simultaneously grasped in the hand of an operator, and said hanger being pivotally connected to said trolley for rotation about a vertical axis whereby said frame and hanger provide a universal support for said housing.

References Cited in the file of this patent

UNITED STATES PATENTS

| | | |
|---|---|---|
| 418,804 | Miller | Jan. 7, 1890 |
| 778,525 | Alexander | Dec. 27, 1904 |
| 1,218,765 | Hauer | Mar. 13, 1917 |
| 1,273,077 | Lund | July 16, 1918 |
| 2,225,200 | Ames | Dec. 17, 1940 |
| 2,580,863 | Tuck | Jan. 1, 1952 |
| 2,619,663 | Johnson | Dec. 2, 1952 |

FOREIGN PATENTS

| | | |
|---|---|---|
| 674,645 | Germany | Apr. 19, 1939 |